July 11, 1944.　　A. U. BRYANT　　2,353,143
FLUID FLOW CONTROL DEVICE
Filed Sept. 29, 1942　　5 Sheets-Sheet 1

INVENTOR
Austin U. Bryant
BY
Paul D. Flehr
ATTORNEY

July 11, 1944.  A. U. BRYANT  2,353,143
FLUID FLOW CONTROL DEVICE
Filed Sept. 29, 1942   5 Sheets-Sheet 2

INVENTOR
Austin U. Bryant
BY
Paul D. Flehr
ATTORNEY

FIG_8_

FIG_9_

FIG_10_

FIG_11_

FIG_12_

Patented July 11, 1944

2,353,143

UNITED STATES PATENT OFFICE 2,353,143

FLUID FLOW CONTROL DEVICE

Austin U. Bryant, Berkeley, Calif., assignor to Fluid Control Engineering Co., a copartnership consisting of Marvin H. Grove and Julia E. Grove, both of Piedmont, Calif.

Application September 29, 1942, Serial No. 460,091

7 Claims. (Cl. 137—139)

This invention relates generally to devices for controlling the flow of various fluids.

It is an object of the invention to provide a flow control device which is particularly adapted to withstand the abrasive action of suspended solids and liquids, such as sand and the like.

Another object is to provide a flow control device which can be made to withstand the action of various chemicals, as for example salt water.

Another object is to provide a device which can be used for controlling the flow of fluids over a wide range of pressures without chattering or serious water hammer.

Another object is to provide a novel type of valve or flow control device making use of fluid from the inlet side to supply the power required to effect a closure, together with a small control valve requiring only negligible energy for its operation.

Another object is to provide a valve or flow control device making use of a resilient tube which is flexed in a novel manner to control fluid flow.

A further object is to provide a valve which can be made in large sizes, and which will make possible rapid shutoff without mechanism such as supplemental motor operators.

Additional objects of the invention will appear from the following description in which the preferred embodiments have been set forth in detail, in conjunction with the accompanying drawings.

Referring to the drawings.

The device as illustrated in Figures 1 to 5 inclusive, includes a body 10 which is formed to provide the fluid passages 11 and 12. Passage 11 in this instance is an inlet and is intended to be coupled to a pipe which in turn connects with a source of fluid under pressure. Within the body there is a tube 13 formed of relatively flexible resilient material such as soft vulcanized rubber, or equivalent synthetic material. It is desirable to make this tube cylindrical, or substantially cylindrical, with its ends provided with integral outturned and inturned flanges 14 and 16 respectively. It will be presently pointed out how the ends of this tube are sealed with respect to the body about passages 11 and 12.

Figures 1, 2:
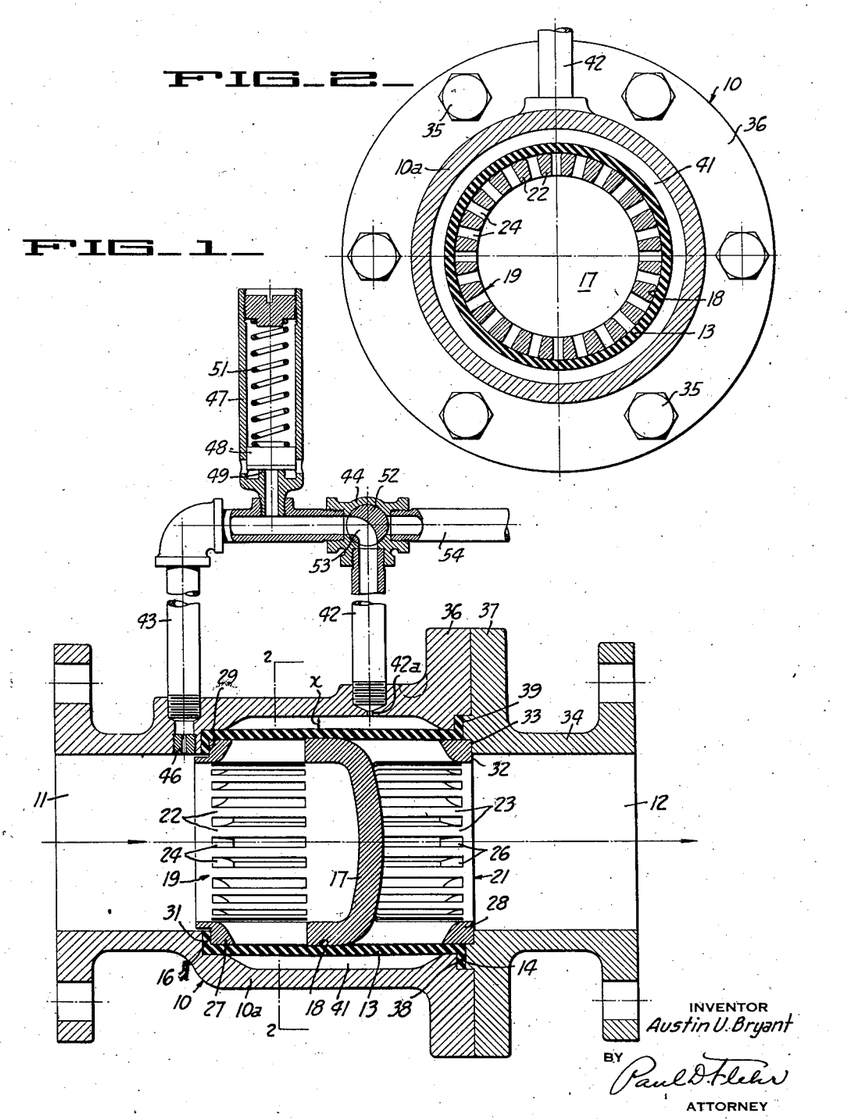
Figure 1 is a side elevational view in cross section showing a device incorporating the present invention.
Figure 2 is a cross sectional detail taken along the line 2—2 of Figure 1.

Within the tube 13 there is a barrier 17 which is circularly contoured, and which has a peripheral surface 18 which is relatively smooth and adapted to effect a seal with respect to an adjacent portion of the tube 13. To retain the barrier 17 in proper position intermediate the ends of the tube 13, and in order to prevent inward collapsing of the tube on the inflow and outflow sides of the barrier, I provide annular abutment grids 19 and 21. These grids can be conveniently formed integral with the barrier 17, and as illustrated they consist of circumferentially spaced ribs 22 and 23, whereby fluid may flow through the slots 24 and 26 between these ribs. The end portions of the grids include the annular ring portions 27 and 28. Ring portion 27 provides an annular face 29 opposed to the annular shoulder 31 formed on the body, whereby the flange 16 can be squeezed between these faces to provide the desired seal. Ring portion 28 has its end face 32 engaged by a shoulder 33 formed on the separate body part 34. Body part 34 is clamped to the main body by suitable means such as bolts 35 engaging the adjacent flanges 36 and 37. It can be in the form of a flanged coupling as illustrated for making connection to outflow piping.

In order to seal the flange 14 with respect to the body, this flange is clamped between an annular shoulder 38 formed on the body, and the annular surface 39 formed upon the body part 34. While the diameter of peripheral surface 18 of barrier 17 can be the same as the outer diameter of grids 19 and 21, it is desirable to form it on a slightly larger diameter to facilitate machining.

The body 10 is also formed to provide a closed fluid chamber 41 which extends about the tube 13. Controlling fluid pressure is applied to this chamber through a suitable fluid duct such as pipe 42, in order to effect opening and closing operations as will be presently described. The wall 10a of body 10 is annular in cross section and has its inner surface so disposed as to form an abutment to limit expansion of tube 13.

It is possible to connect pipe 42 to a separate and independent source of either pneumatic or liquid fluid under pressure to operate the device. However, the particular arrangement illustrated is desirable for many applications, and makes use of fluid taken from the inflow side for effecting opening and closing operations. In applying this inflow pressure, a flow control valve is employed so that the fluid pressure in chamber 41 can either be increased to a value approximately equal to the inflow pressure, or may be vented to a lower pressure. In addition, with the smaller sized valves and when the device is connected to liquid inflow piping of considerable length, it is desirable to incorporate means preventing too rapid closure.

In the arrangement illustrated in Figures 1 to 5, pipe 43 has its one end connected to the inflow passage 11 and has its other end connected to the control valve 44. Pipe 42 connects between control valve 44 and chamber 41. An orifice 46 serves to somewhat restrict flow of liquid from passage 11 to the pipe 43. Also orifice 42a which connects pipe 42 with chamber 41, affords some flow restriction. A small pressure relief valve 47 is also shown connected to the pipe 43. This relief valve can be conventional in construction and can consist, for example, of a small valve member 48 urged upon a seat 49 by the compression spring 51. It is set to automatically vent a small amount of liquid from the pipe 43 when liquid pressure within this pipe attains a value somewhat greater than the maximum operating pressure for which the device is being applied. For example, if the inflow pressure ranges from 50 to 150 pounds, relief valve 47 is set to automatically vent a small amount of liquid from pipe 43 when the pressure in this pipe attains a somewhat greater value, such as 165 pounds or more. As will be presently explained, the use of this relief valve is not essential.

Figure 12:
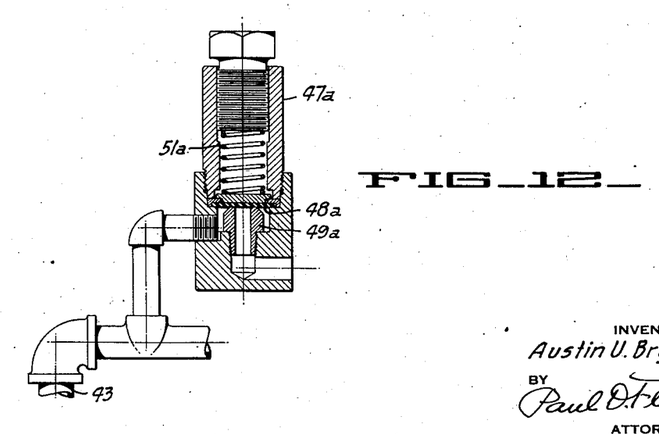
Figure 12 is a cross sectional detail, in side elevation, showing a modified type of relief valve.

Another desirable form of relief valve is shown in Figure 12. This valve includes a small diaphragm 48a, made of resilient material like rubber, and urged upon seat 49a by compression spring 51a. Fluid pressure is applied to the under side of the diaphragm about seat 49a, and when a set pressure is reached, the diaphragm flexes upwardly to permit flow through the seat.

Control valve 44 can vary in detail and can be either operated manually or operated from a remote point by suitable remote control operating means. In this instance it is illustrated as a simple valve of the plug type, with the plug 52 provided with a port 53. When in the position shown in Figure 1, pipes 42 and 43 are in communication, and fluid from the inflow side can pass into the chamber 41. When turned 90° in a clockwise direction, communication between pipes 42 and 43 is interrupted, and pipe 42 is connected to the vent pipe 54. Pipe 54 may connect with the outlet passage or it can be discharged to the atmosphere.

To describe operation of the device, it should be explained that in Figure 1, tube 13 has been shown in relaxed position, at which time its intermediate portion is in engagement with the peripheral surface 18 of the barrier 17. In this connection its is desirable that tube 13 be made with an inside diameter slightly smaller than the diameter of barrier 17, so that the tube fits snugly over the barrier, and is slightly stretched in a radial direction. Assuming now that the inflow 11 is connected to an extended length of pipe, which in turn leads to a source of liquid under pressure, the liquid pressure is transmitted through pipes 43 and 42 (when the control valve 44 is open as shown in Figure 1), and applied in chamber 41 about the tube 13. Tube 13 is collapsed or in close engagement with both the grids 19 and 21 and the barrier (Figure 1).

To open the valve to permit flow of liquid past the barrier 17, valve 44 is turned to connect pipes 42 and 54, thus venting liquid from chamber 41 to the atmosphere. Initially this causes that portion 13a of the rubber tube on the inlet side (about grid 19) to expand to substantially the position shown in Figure 3. This places the tube 13 in a peculiar form in which one tube portion 13a is expanded against the wall 10a, and a second tube portion 13b is subjected to pressure in chamber 41 and remains pressed inwardly upon the peripheral surface 18 and upon the abutment grid 21. A third intermediate unsupported portion 13c is shaped generally like a truncated cone, and extends between the barrier and wall 10a.

Figure 4:
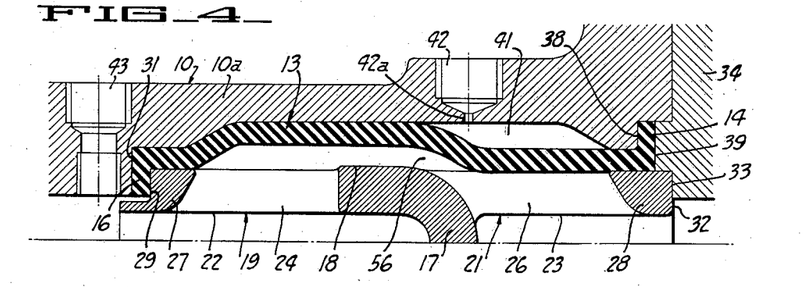
Figure 5:
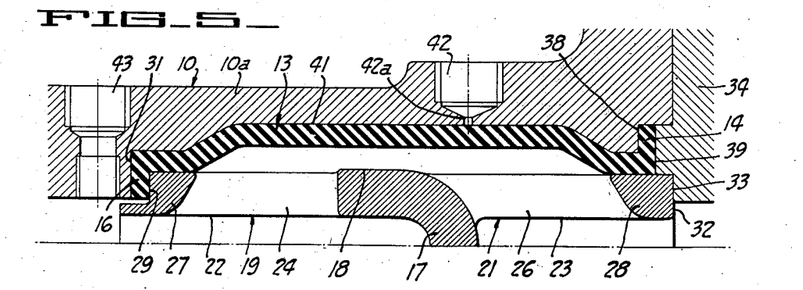

As the liquid from chamber 41 continues to vent to the atmosphere, the conical shaped portion 13c progresses in the direction of the axis of the tube, to a position such as shown in Figure 4, in which an annular orifice 56 is formed between the periphery of the barrier 17 and the adjacent portion of the tube. It will be evident that liquid is now free to flow from the inlet side through orifice 56 to the outlet 12, the flow passing through the slots 24 and 26. In the event some back pressure is built up in the outlet 12, while the device is fully open, such back pressure will cause the entire length of the tube to be expanded into engagement with the surrounding wall 10a, as illustrated in Figure 5.

In order to close the device after it has been opened, it is only necessary to turn the control valve 44 back to the position shown in Figure 1, in which event liquid from the inflow side is again applied to chamber 41 to return the tube to the position shown in Figure 1. While in the process of closing, the portion 13b of the tube is first collapsed to close upon the major part of the grid 21, after which the intermediate portion of the tube closes upon the barrier, and finally tube portion 13a completely collapses upon the grid 19.

In closing the device, water hammer may result in the event it is connected to an extended inflow pipe and the shutdown is effected too quickly, particularly where the smaller sized valves are employed (for example, 2 inch). Relief valve 47 prevents too rapid shutoff under such conditions, even though the control valve 44 is moved substantially instantaneously to the position shown in Figure 1. In accomplishing this result, the relief valve by venting a small amount of liquid relieves any excessive surge pressure which may be transmitted into pipe 43, thus preventing too rapid introduction of water into chamber 41. Where the inflow piping or the usage is such that the device is not subject to pressure surges, or where the size of the valve imposes an inherent time lag for closing, as with larger sized valves (such as 4 inches or more), the relief valve may be omitted together with orifice 46.

Due regard must be given to the dimensioning of the annular clearance about tube 13 in the region of the barrier 17. If this clearance, marked X in Figures 1 and 2, is made too large, severe chattering will result for substantially all operating pressures, and the device will be virtually useless for most applications. The chattering takes place during opening and closing operations and tends to place severe strains upon associated piping and to cause wear or disintegration of the rubber tube. It is experienced not only when handling liquids with application of liquid pressure to chamber 41, but also where liquids are handled with application of air or other gas under pressure about the tube 13. Even when handling flow of gases an excessive clearance will cause a vibratory or fluttering action of the rubber tube, such as is conducive to rapid wear or disintegration. To demonstrate the effect of the clearance X upon operation of the device, I have constructed a large number of sample devices with different clearances, and have operated such devices over a wide range of operating pressures. Pertinent examples of these tests are as follows:

*Example I.*—The device was constructed substantially as shown in Figures 1 to 5 inclusive, with a barrier having a diameter of 2⅞ inches and a width of about ⅞ of an inch (on its outer periphery), for a 2 inch valve, and with a tube made of resilient rubber ⅛ of an inch thick. With a clearance X of about 1/16 of an inch, operation was distinctly unsatisfactory in that the device was subject to chatter during opening and closing operations, for operating pressures ranging from 30 to 200 lbs. per square inch. With a clearance of ¼ of an inch for the same device, chattering was substantially relieved, but not entirely cured over the same operating range. With a clearance less than ¼ of an inch, namely about 1/16 of an inch, the device operated smoothly without chattering for the same pressure range.

*Example II.*—The device was constructed as described above, with a barrier 1½ inches in diameter and about ½ inch wide (at its outer periphery), for a 1 inch valve. Rubber tubes were used having both ⅛ and 1/16 inch wall thicknesses. With a clearance of about 3/32 of an inch about the barrier, both tubes operated satisfactorily without chattering over the pressure range indicated above. With a clearance of about 5/32 of an inch a small amount of chatter was noticed for both tubes during opening and closing operations. The thinner walled rubber tube tended to chatter slightly more for the same clearance. With a clearance of 1/16 of an inch, the chatter became quite severe for both tubes over the above pressure range.

*Example III.*—The device was made as a 6 inch valve, with a barrier 8 inches in diameter and having a width at its outer periphery of ⅞ of an inch. The rubber tube had a ¼ inch thick wall. With a clearance of ⅜ of an inch, the valve gave smooth operation over the pressure range of about 30 to 200 lbs. per square inch. With a clearance of about 7/16 inch, some chattering was noticeable.

As is made clear by the examples specified above the extent of clearance about the tube in the region of the barrier is critical and is dependent upon the diameter of the barrier. In actual commercial designs for 4 inch valves or larger I proportion this clearance to be about 1/20 to 1/22 of the diameter of the barrier, in order to secure proper satisfactory operation over a wide range of operating pressures. Somewhat greater clearances can be used in some instances, such as about 1/16 the diameter of the barrier, but when clearances of the order of about 1/8 the diameter of the barrier are employed, the device is subject to chattering for operating pressures of the order of from 30 to 200 lbs. per square inch. As shown by the examples the higher ratios are desirable for the larger sized valves.

Other factors also influence chattering, but not to the same extent as the clearance. For example, chattering is influenced by such factors as the width of the barrier, the size and length of the slots 24 and 26, the thickness of the rubber tube, the flexibility of the material from which the tube is made, and the character of the associated piping.

It will be noted that the figures specified above for the clearance about the barrier will afford an annular orifice cross sectional area about the barrier for full open position of the valve which is substantially less than the cross sectional pipe area for which the valve is designed. For example with the dimensions specified above the annular orifice area about the barrier corresponding to open position of the valve, amounts to about 50% or less of the cross sectional flow area of the pipe diameter for which the valve is designed. This is no serious detriment because with proportions such as specified the flow resistance through the valve compares favorably with or is better than standard globe valves.

The fact that the grid slots 23 and 24, and particularly the slots on the inflow side, are relatively long compared to their width, also aids in conjunction with the clearance to afford smooth operation without chattering. In actual commercial designs the cross sectional flow area afforded by the combined area of these slots, on the inflow side, corresponds generally to the cross-sectional flow area of the pipe size to which the valve is designed. However, the length of these slots causes a graduated cut-off of the flow as the tube is collapsed along the outflow grid portion, to ultimately engage the periphery of the barrier. In general I have found it desirable to proportion the length of the slots on the outflow side to approximately ⅓ of the diameter of the barrier, or more.

In the foregoing examples and explanation of chattering, reference has been made to use of pressures ranging from 30 to 200 lbs. per square inch. This is a pressure range covering a wide variety of applications for such valves. With relatively low inflow pressures, as for example from 10 to 20 lbs. per square inch, some chattering will be experienced during opening and closing operations, particularly when handling liquids. However, in many commercial applications such low pressures are not encountered.

The device described above is particularly adapted for use with various liquids and chemicals. Ordinary resilient rubber is not attacked by a wide variety of chemicals, and the inner metal parts of the device can be readily made of special metals or alloys, to resist chemical corrosion. For example, the device can be successfully used in the handling of salt water which is difficult to handle by conventional valves. In the event the liquid being handled consists of or contains material which will deteriorate rubber, as for example, hydrocarbons, then the tube 13 can be made of special pliable materials, such as "Neoprene," "Buna Hycar," or like synthetic products.

A further feature of the device is that in the embodiment described the primary power for effecting opening and closing operations is derived from fluid taken from the inflow side. The control valve requires very little energy for its operation, and as previously pointed out, irrespective of the rapidity with which this valve is moved between its operating positions, the main flow is controlled without chatter or water hammer over a wide variety of operating pressures.

A further feature of the device is that it is capable of resisting abrasion by solids carried in the liquid stream. For example, the device can be operated for long periods of time on water carrying sand and silt which would severely cut the sealing surfaces of ordinary conventional valves. If the action of abrasives should effect some cutting of the periphery 18, it has been found that the cutting takes the form of annular channeling extending about the barrier, and that in spite of such channeling, the device will still shut off tightly.

Figure 3:
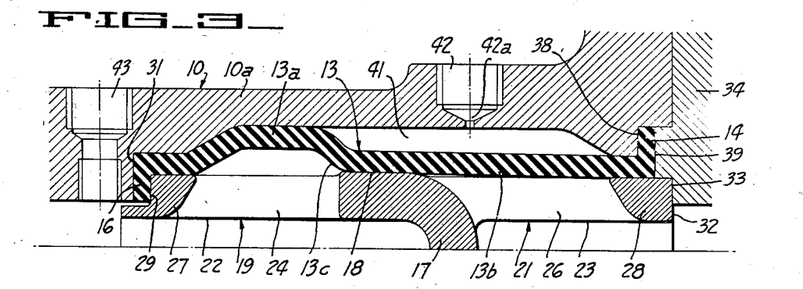
Figures 3, 4 and 5 are enlarged cross sectional details showing the manner in which the rubber tube is flexed during different conditions of operation.

Reference has been made to the form of the tube during an opening operation as shown in Figure 3, and to the progression of tube portion 13c until the valve is open. This progression is accompanied by a peeling away of the tube from the periphery of the barrier, which is desirable in that it tends to assist in separating the tube from the barrier, irrespective of any tendency for the tube to adhere.

Flow resistance through the valve is not excessive, and in fact the valve in this respect is somewhat superior to standard globe valves. This is made possible by use of a rubber tube substantially larger than the inlet and outlet passages, which also permits use of a clearance about the tube which is sufficiently small to prevent chattering and to afford the desired peeling action described above.

A further feature of the device is that in the event of injury or rupture of the tube 13, it can be readily replaced by detaching the body part 34 after which the assembly comprising the rubber tube, barrier 17, and grids 19 and 21 can be slipped out of the body.

Figure 6:
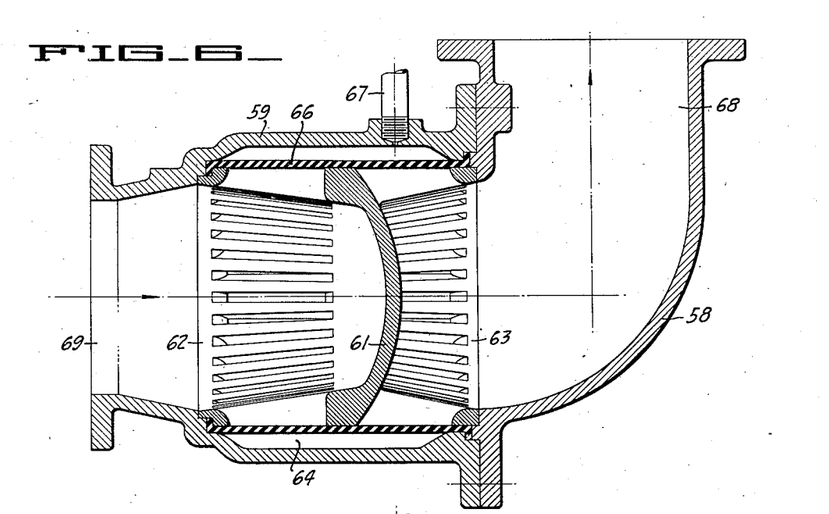
Figure 6 is a side elevational view in cross section showing another embodiment of the invention.

Figure 6 shows another embodiment of the device where the valve is inserted in a right angle bend. Thus, a detachable elbow 58 is secured to the main body 59, and retains the rubber tube and barrier in place the same as the body part 34 of Figure 1. The barrier 61 together with the inner annular grids 62 and 63 are similar to the barriers 17 and grids 19 and 20 of Figure 1, except that the parts are designed for greater strength as is desirable for larger size valves. The chamber 64 surrounding the tube 66 is shown receiving controlling fluid from the pipe 67. This pipe can correspond to the pipe 42 of Figure 1, and it can connect to the inlet side in conjunction with controlling and relief valves as previously described. Pipe 67 can also connect to a source of gas under pressure, so that gas pressure can be applied to chamber 64 or vented for effecting the desired opening and closing operations. In this figure, the rubber tube 66 is shown in closed position, corresponding to the position illustrated in Figure 3. When the valve is opened, the fluid may pass from inlet 67 about the barrier 61 to the outlet 68.

Figure 7:
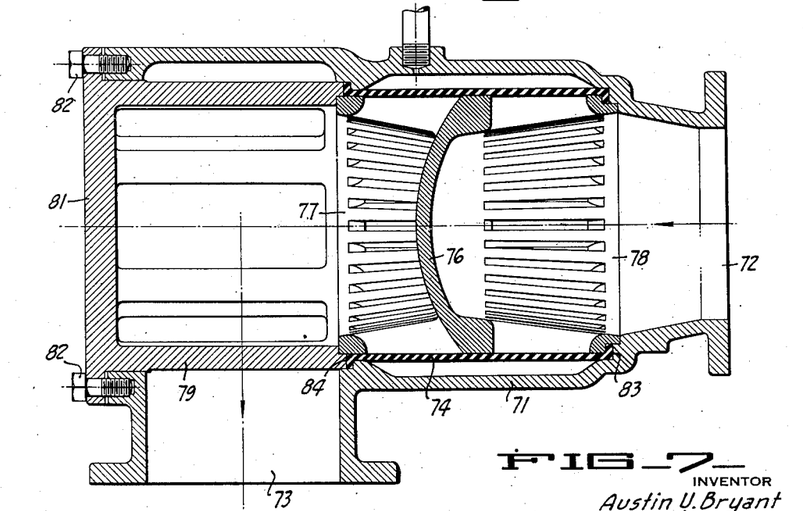
Figure 7 is a view like Figure 6, but showing a third embodiment of the invention.

The embodiment shown in Figure 7 is likewise a right angle valve, and has the characteristic that the inner assembly can be readily removed without disturbing the connections to the inflow and outflow piping. Thus, in this case the body 71 is provided with the inflow and outflow passages 72 and 73 at right angles to each other. The inner assembly comprising the resilient tube 74, barrier 76, and grids 77 and 78 is the same as shown in Figure 6. A ported sleeve 79 extends into one side of the body, and is retained in place by an outer flange 81 and the clamping screws 82. The inner end of the sleeve 79 bears upon the adjacent end of grid 77 to provide tight clamping engagement upon flange 83, and in addition it clamps upon the adjacent outturned flange 84, thus effectively retaining the inner assembly in place and sealing the ends of the tube 74 with respect to the body. It will be evident that the inner assembly comprising the rubber tube, barrier 76, and the grids 77 and 78, can be readily removed from the body for replacement or repair, after removing the sleeve 79.

Figures 8, 9, 10:
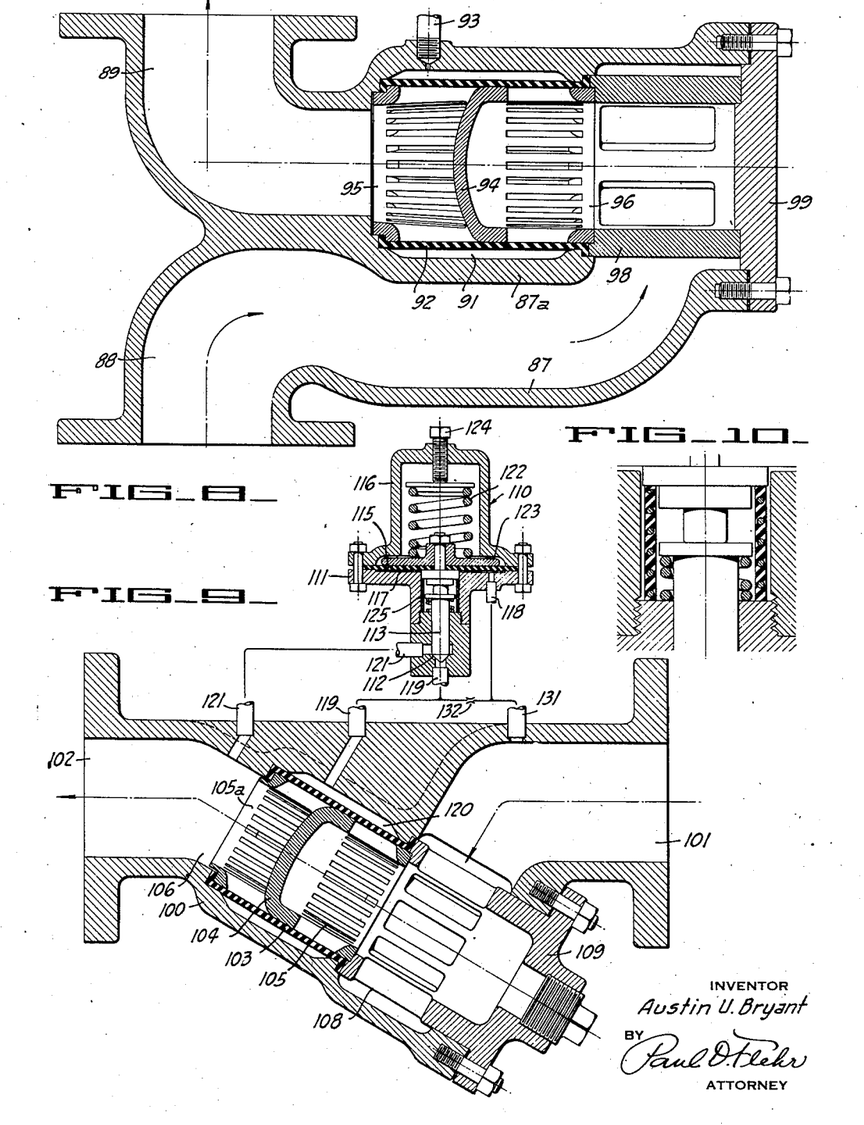
Figure 8 is a view like Figure 6, but showing a fourth embodiment of the invention.
Figure 9 is a side elevational view in cross section showing another embodiment of the invention, the device in this instance being adapted particularly as a pressure relief valve.
Figure 10 is an enlarged cross sectional detail showing particularly the means for establishing a seal about a control valve member.

Figure 8 shows another embodiment which has inlet and outlet passages in alignment, and which is also adapted for the removal of the inner assembly without disturbing connections with the inflow and outflow piping. Thus, in this case body 87 has the aligned inflow and outflow passages 88 and 89, and which within the body are both deflected laterally and parallel. The wall portion 87a, which in part has an inner partition and in part forms an outer wall for the body, is annularly shaped and corresponds generally to the wall 10a Figure 1. Thus, an annular chamber 91 is formed about the tube 92, and this chamber is connected to a source of controlling fluid through pipe 93. The inner assembly comprising the tube 92, together with the barrier 94 and grids 95 and 96, is in this instance shaped as shown in Figure 1, and is retained in place by the ported sleeve 98. This sleeve in turn is engaged by the outer closure plate 99. Upon removal of the closure plate 99, it is apparent that sleeve 98 can be removed, and also one can remove the inner assembly comprising the resilient tube 92, the barrier 94, and the adjacent grids 95 and 96.

Because the axis of the resilient tube in Figure 8 is at right angles to the line of centers of the inflow and outflow passages, it is possible in this instance to have the inflow and outflow connecting flanges spaced relatively close together, thus making the device interchangeable with other valves of standard construction.

Figures 9 and 10 show a further embodiment which is adapted for removal of the inner assembly without disturbing connections with the inflow and outflow spring. Also in this instance a type of fluid operated control valve is employed so that the device can serve as a pressure relief device. Thus the body 100 has aligned inflow and outflow passages 101 and 102. The inner assembly comprising the rubber tube 103, barrier 104, and the grids 105 and 105a, is positioned within a bore 106 which extends at an angle to the line of centers of passages 101 and 102. The inner assembly is retained in position by the ported sleeve 108, which is attached to the closure plate 109. When the tube 103 is in open position with respect to the barrier, fluid flow occurs from passage 101 into the ported sleeve 108, past the barrier, and to the outflow opening 102.

The control valve 110 in Figure 9 consists of a body 111 formed to provide the valve seat 112 and the cooperating valve member 113. The upper end of valve member 113 engages a stud 114, which is centrally attached to the flexible diaphragm 115. The peripheral edge portion of this diaphragm is clamped between the upper side of the main body 111 and the top body part 116. A closed fluid chamber 117 is formed below the diaphragm and is connected by pipe 118 to the inflow passage 101. The space below valve seat 112 is connected by pipe 119 to the chamber 120 about the tube 103. The pipe 121 serves to connect the space above the seat 112 to the outlet opening 102.

Diaphragm 115 is loaded by the compression spring 122, the lower end of which is seated upon the diaphragm plate 123. A set screw 124 engages the upper end of this spring to make adjustments.

A seal is established about the upper end of valve 113 by the tube 125. This tube is formed of resilient material such as soft vulcanized rubber, and the collapsing of the tube is prevented by a helical wire spring 126, which is embedded within the rubber. The upper and lower ends of this tube are sealed with respect to the diaphragm and the body. This seal is established by having the upper end of tube 125 engage an annular shoulder 127, carried by the diaphragm about stud 114. The lower end of the tube 125 seats upon an annular abutment surface 128 formed about the valve member 113 on the body. Normal compression of the tube 125 serves to maintain the desired sealing engagement between the ends of the tube and the adjacent surfaces just described.

In order to insure opening of valve member 113 when the diaphragm flexes upwardly, a compression spring 129 is provided, which has its lower end seated upon the body, and its upper end engaging the enlarged head 130 on the valve member 113.

In conjunction with the pipe connections described for Figure 9, a flow connection 131 interconnects pipes 118 and 119, and in this flow connection there is a flow restricting orifice 132.

To describe the operation of Figure 9, it will be presumed that the inlet passage 101 is connected to a source of liquid under pressure, and that it is desired to discharge liquid from the source in the event the liquid pressure rises above a predetermined value. Assuming first that the inlet pressure is below the value required for operation, the inlet pressure is transmitted through orifice 132 and pipe 119 to the chamber 120 to maintain the tube 103 closed upon the barrier 104. Should the inlet pressure rise above the predetermined desired value, diaphragm 115 is forced upwardly to open valve member 113, thus venting liquid through pipe 121. This in effect vents liquid from the chamber 120 and immediately lowers the pressure in this chamber because insufficient liquid can pass through orifice 132 to maintain a pressure in chamber 120 with valve 113 open. As a result, the tube 103 moves toward open position, thus permitting the liquid to flow out from the liquid storage tank or other source at a regulated rate. When the pressure applied to the inflow passage has dropped below a predetermined value, which is somewhat lower than the initial operating pressure, the pressure in the chamber below the diaphragm 115 drops to a value such that the diaphragm moves downwardly under the urge of spring 122 to close about member 104. Thereafter pressure in chamber 120 increases until this pressure equals the inflow pressure, thus causing the tube 103 to completely close upon the barrier.

Figure 11:
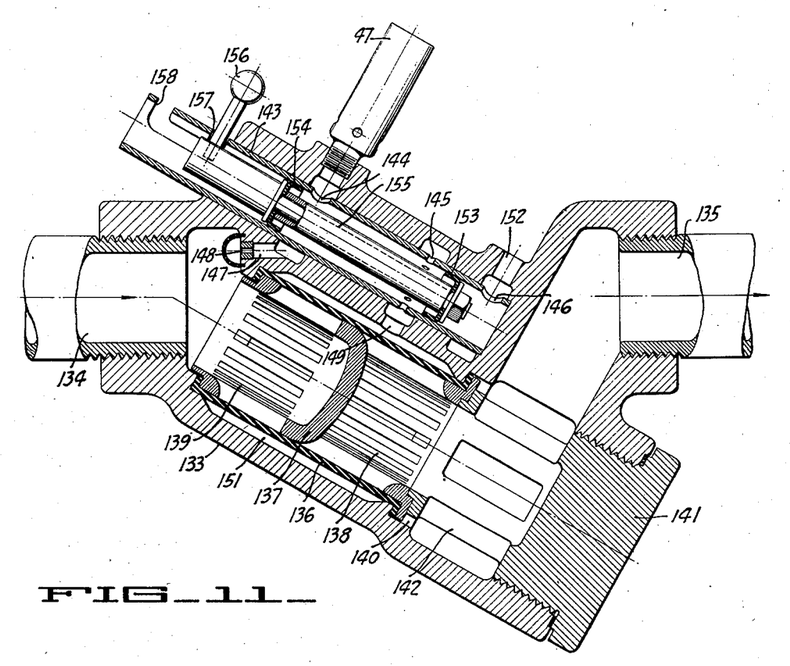
Figure 11 is a side elevational view in cross section of a further embodiment, characterized particularly by a manual control valve mounted directly upon the body.

Another embodiment is illustrated in Figure 11 which embodies a special manually operated valve for its operation. Thus in this instance the body 133 also has aligned inflow and outflow passages 134 and 135, and the inner assembly comprising the rubber tube 136, barrier 137, and grids 138 and 139, is carried within a bore 140, which is at an angle to the line of centers of passages 134 and 135. The inner assembly is held in position by the threaded closure plug 141 which carries the inner ported sleeve 142.

The body is also ported to receive the tubular liner 143 which forms a part of the manual valve means for controlling operation of the device. The side walls of this liner are provided with three sets of ports 144, 145 and 146. The duct 147 in the body serves to connect the inflow passage 134 with the ports 144. Within this duct there is a flow restricting orifice 148. Duct 149 serves to establish communication between the chamber 151 about the tube 136 and the ports 145. A duct 152 communicates with ports 146 and serves to vent off liquid either to the atmosphere or to a low pressure outflow side. Within the tubular line 143 are the cup washers 153 and 154 which are carried by the longitudinally movable plunger 155. The outer end of this plunger carries a short operating lever 156 which is engageable in either one of two positioning slots 157 and 158.

Operation of the device shown in Figure 11 can be briefly outlined as follows: With the cup washers positioned as shown in Figure 11, fluid from the inflow side is free to pass through duct 147, ports 144 and 145, to the chamber 151 about the resilient tube 136. Thus, if the inflow passage 134 is connected to a source of liquid under pressure, the rubber tube is closed upon the barrier. When the operating lever 156 is shifted to its second position in which it is engaged in slot 158, cup washer 153 moves to a position intermediate portions 144 and 145, thus interrupting communication between the inflow passage and chamber 151, and venting this chamber through ports 145 and 146 to the venting duct 152. As previously described, this causes the tube 136 to be expanded to open position. Relief valve 47, as previously described, prevents too rapid shutoff, irrespective of the rapidity with which lever 156 may be manually moved to closed position.

This application is a continuation in part of subject matter disclosed in my co-pending application Serial No. 429,258, filed Feb. 2, 1942 for Fluid flow control device.

I claim:

1. In a flow control device, a body having inlet and outlet passages for flow of fluid, a tube of resilient material disposed within the body and having its ends sealed with respect to the body about the passages, a circularly contoured barrier disposed within the tube intermediate the ends of the same, the adjacent annular portion of the tube being adapted to engage and seal upon the periphery of the barrier, grids disposed within the end portions of the tube on opposite sides of the barrier to prevent inward collapsing of the tube, and means forming a closed annular fluid chamber about the tube and extending a substantial distance on both the inlet and outlet sides of the barrier, there being a duct communicating with that portion of the chamber on the outflow side of the barrier for applying a controlling fluid under pressure to the same, said means including an annular abutment wall surrounding the tube in a region surrounding the barrier, said abutment wall being positioned with respect to the barrier and the outer surface of the tube so that one portion of the tube on the inflow side of the barrier can be expanded in contact with the same by fluid pressure applied to one of the passages, while an adjacent annular tube portion is retained in sealed engagement with the periphery of the barrier by fluid pressure within said chamber, reduction of pressure in the fluid chamber serving to form an annular orifice between the barrier and the tube for flow of fluid between the passages.

2. In a flow control device, a body having inlet and outlet passages for flow of fluid, a tube of resilient material disposed within the body and having its ends sealed with respect to the body about the passages, a circularly contoured barrier disposed within the tube intermediate the ends of the same and having a diameter greater than the diameter of the passages, the adjacent annular portion of the tube being adapted to engage and seal upon the periphery of the barrier, grids disposed within the end portions of the tube on opposite sides of the barrier to prevent inward collapsing of the tube, and means forming a closed annular fluid chamber about the tube and extending a substantial distance on both the inlet and outlet sides of the barrier, there being a duct communicating with that portion of the chamber on the outflow side of the barrier for applying a controlling fluid under pressure, said last means including an annular abutment wall surrounding the tube in a region adjacent the barrier, said abutment wall being so positioned with respect to the barrier and the outer surface of the tube that one portion of the tube on the inflow side of the barrier can be expanded in contact with said wall by fluid pressure applied to one of the passages, while an adjacent annular tube portion can be retained in sealed engagement with the periphery of the barrier by fluid pressure within said chamber, said tube portions when so positioned being joined by a tube portion shaped like a truncated cone, reduction of fluid pressure in said chamber serving to form an orifice between the barrier and the tube for flow of fluid between the passages.

3. In a flow control device, a body having inlet and outlet passages for flow of fluid, a tube of resilient material disposed within the body and having its ends sealed with respect to the body about the passages, a circularly contoured barrier disposed within the tube intermediate the ends of the same and having a diameter greater than the diameter of the passages, the adjacent annular portion of the tube being adapted to engage and seal upon the periphery of the barrier, grids disposed within the end portions of the tube on opposite sides of the barrier to prevent inward collapsing of the tube, the grid on the inflow side of the barrier affording a plurality of circumferentially spaced slots extending from the barrier for a distance at least about one third the diameter of said barrier, and means forming a closed annular fluid chamber about the tube and extending a substantial distance on both the inlet and outlet sides of the barrier, there being a duct communicating with that portion of the chamber on the outflow side of the barrier for applying a controlling fluid under pressure, said last means including an annular abutment wall surrounding the tube in a region adjacent the barrier, said abutment wall being so positioned with respect to the barrier and the outer surface of the tube that one portion of the tube on the inflow side of the barrier can be expanded in contact with said wall by fluid pressure applied to one of the passages, while an adjacent annular tube portion can be retained in sealed engagement with the periphery of the barrier by fluid pressure within said chamber, said tube portions when so positioned being joined by a tube portion shaped like a truncated cone, reduction of fluid pressure in said chamber serving to form an orifice between the barrier and the tube for flow of fluid between the passages.

4. In a flow control device, a body having inflow and outflow passages for flow of fluid, a cylindrical shaped tube of resilient material disposed within the body and having its ends sealed with respect to the body about the passages, a circularly contoured barrier disposed within the sleeve intermediate the ends of the same, the adjacent annular portion of the tube being adapted to engage and seal upon the periphery of the barrier, grid means disposed within the end portions of the tube on opposite sides of the barrier to prevent inward collapsing of the tube, and means forming a closed annular fluid chamber about the tube and extending a substantial distance on both the inlet and outlet sides of the barrier, there being a duct communicating with that portion of the chamber on the outflow side of the barrier for applying a controlling fluid under pressure whereby the tube can be either caused to seal upon the periphery of the barrier or permitted to pass fluid through an orifice between the periphery of the barrier and the tube when fluid under pressure is applied to one of the passages, said last means including an annular abutment wall surrounding the tube in the region of the barrier, said abutment wall being so positioned with respect to the barrier and the outer surface of the tube that one end portion of the tube on the inflow side of the barrier can be expanded in contact with said wall by fluid pressure applied to the inflow passage, while an adjacent annular tube portion is retained in sealed engagement with the periphery of the barrier by fluid pressure within said chamber, said tube portions when so positioned being joined by a relatively short unsupported tube portion shaped like a truncated cone, reduction of pressure in the fluid chamber to a lower value substantially below the pressure in said one passage serving to cause progression of said conical shaped portion longitudinally of the tube to form an annular orifice between the tube and the barrier.

5. In a flow control device, a body having inflow and outflow passages for flow of fluid, a tube of resilient material disposed within the body and having its ends sealed with respect to the body about the passages, a circularly contoured barrier disposed within the sleeve intermediate the ends of the same, the adjacent annular portion of the tube being adapted to engage and seal upon the periphery of the barrier, means disposed within the end portions of the tube on opposite sides of the barrier to prevent inward collapsing of the tube, and means forming a closed annular fluid chamber about the tube and extending a substantial distance on both the inlet and outlet sides of the barrier, there being a duct communicating with that portion of the chamber on the outflow side of the barrier for applying a controlling fluid under pressure whereby the tube can be caused to either seal upon the periphery of the barrier or can be permitted to expand to permit flow of fluid between said passages and through an annular orifice about the periphery of the barrier, said last means including an annular abutment wall surrounding the tube in the region of the barrier, the clearance between the outer surface of the tube and said abutment wall, when the tube is engaged with the periphery of the barrier, being of the order of from about one-sixteenth to one-twentieth of the diameter of the barrier.

6. In a flow control device, a body having inflow and outflow passages for flow of fluid, the inflow passage being adapted for connection with piping to which liquid under pressure can be applied, a tube of resilient material disposed within the body and having its ends sealed with respect to the body about said passages, means forming a closed fluid chamber about the tube, the tube being adapted to effect a seal between said passages when pressure is applied to said chamber substantially equal to the inflow pressure, a duct serving to form a liquid connection between the inflow side of the device and said chamber, control valve means serving to either establish or interrupt said connection, and also serving to vent said chamber to a lower pressure when communication through said connection is interrupted, a pressure relief valve serving to vent liquid from said connection, in the event pressure in said chamber attains a value substantially greater than the normal inlet pressure for which the device is adapted, and orifice means serving to restrict communication between the inflow side of the device and the point of connection to the pressure relief valve.

7. In a flow control device, a body having inflow and outflow passages for flow of fluid, a cylindrical shaped tube of resilient material disposed within the body and having its ends sealed with respect to the body about the passages, a circularly contoured barrier disposed within the sleeve intermediate the ends of the same, the adjacent annular portion of the tube being adapted to engage and seal upon the periphery of the barrier, means disposed within the end portions of the tube on opposite sides of the barrier to prevent inward collapsing of the tube, means forming a closed annular fluid chamber about the tube, a restricted orifice connected to receive liquid from the inflow side of the device, means connecting the discharge side of the orifice to said chamber, valve means for controlling communication through said connection, whereby said connection can either be established to apply inflow pressure to said chamber or can be interrupted and pressure vented from said chamber, and means for automatically venting liquid from the discharge side of said orifice in the event the pressure of liquid after passing through the orifice exceeds the normal operating inflow pressure.

AUSTIN U. BRYANT.